(12) United States Patent
Nishio et al.

(10) Patent No.: US 8,211,534 B2
(45) Date of Patent: *Jul. 3, 2012

(54) FIBER BOARD CAPABLE OF CAPTURING AND DECOMPOSING ALDEHYDE

(75) Inventors: Tsutomu Nishio, Chita-gun (JP); Akira Hatano, Wakayama (JP); Manabu Kuki, Wakayama (JP)

(73) Assignee: Nichiha Corporation, Nagoya-Shi (JP)

( * ) Notice: Subject to any disclaimer, the term of this patent is extended or adjusted under 35 U.S.C. 154(b) by 777 days.

This patent is subject to a terminal disclaimer.

(21) Appl. No.: 11/902,783

(22) Filed: Sep. 25, 2007

(65) Prior Publication Data

US 2008/0245493 A1    Oct. 9, 2008

(30) Foreign Application Priority Data

Sep. 28, 2006   (JP) ................................. 2006-264960

(51) Int. Cl.
B32B 13/02    (2006.01)

(52) U.S. Cl. .................. 428/294.7; 428/297.1; 162/146; 248/212; 427/376.2

(58) Field of Classification Search ............... 428/294.7, 428/297.1; 248/294.7, 297.1, 212; 427/376.2; 162/146

See application file for complete search history.

(56) References Cited

U.S. PATENT DOCUMENTS

| | | | |
|---|---|---|---|
| 6,143,119 A | 11/2000 | Seidner | |
| 6,410,626 B1 | 6/2002 | Wada et al. | |
| 6,893,683 B1 * | 5/2005 | Hesselmans et al. | 427/385.5 |
| 7,084,203 B2 | 8/2006 | Shibahara et al. | |
| 7,534,485 B2 | 5/2009 | Yamaguchi et al. | |
| 7,790,279 B2 * | 9/2010 | Tonomura et al. | 428/294.7 |
| 2006/0141236 A1 * | 6/2006 | Nakamura et al. | 428/304.4 |
| 2008/0119607 A1 | 5/2008 | Shibahara et al. | |
| 2008/0187738 A1 | 8/2008 | Tonomura et al. | |
| 2008/0245493 A1 | 10/2008 | Nishio et al. | |
| 2009/0253865 A1 | 10/2009 | Shibutani et al. | |

FOREIGN PATENT DOCUMENTS

| | | |
|---|---|---|
| JP | 62-1501 A | 1/1987 |
| JP | 2000-356022 A | 12/2000 |
| JP | 2001-187402 A | 7/2001 |
| JP | 2001-323637 A | 11/2001 |
| JP | 2002-127114 A | 5/2002 |
| JP | 2002-212900 A | 7/2002 |
| JP | 2004-74751 A | 3/2004 |
| JP | 2004-331682 A | 11/2004 |
| JP | 2005-28797 A | 2/2005 |
| JP | 2005-111701 A | 4/2005 |
| JP | 2005-213712 A | 8/2005 |
| JP | 2005-271439 A | 10/2005 |

* cited by examiner

*Primary Examiner* — Matthew Daniels
*Assistant Examiner* — Jacob Thomas Minskey
(74) *Attorney, Agent, or Firm* — Birch, Stewart, Kolasch & Birch, LLP (57) ABSTRACT

A board capable of capturing and decomposing both formaldehyde and acetaldehyde comprises a wood fiber board comprising a plant fiber of 30 wt % or more, and an aldehyde capturing agent comprising at least carbodihydrazide which is impregnated and solidified inside the side of the fiber board. In addition to the wood fiber board, a fiber board made of a mixture material of a resin fiber and a plant fiber combined. A carbodihydrazide is sprayed onto the fiber board in the form of water solution and optionally comprises a surfactant.

19 Claims, 2 Drawing Sheets

FIBER BOARD CAPABLE OF CAPTURING AND DECOMPOSING ALDEHYDE

This non-provisional application claims priority under 35 U.S.C. 119(a)-(d) on Application No. 2006-264960 filed in Japan on Sep. 28, 2006.

FIELD OF THE INVENTION

Present invention relates to a fiber board used for an interior material of building, a template material, floor protecting material, an interior-protecting material, an interior material for vehicle and the like, particularly a fiber board capable of effectively capturing/decomposing both formaldehyde and acetaldehyde.

DESCRIPTION OF THE RELATED ART

Wood panels used as a component in building materials or furniture includes an adhesive and a binder which often contains aldehyde such as formaldehyde and acetaldehyde. The exposure of persons to aldehyde leads to the "Sick House Syndrome". The Ministry of Land, Infrastructure and Transport Government of Japan reformed the Building Code on Jul. 1, 2003 in order to address the "Sick House Syndrome". In the reformed Building Code, the regulated value was set with respect to formaldehyde, however, no regulated value was set with respect to acetaldehyde. Also "Sick Car" is a similar ailment which is becoming a major problem where a large amount of aldehydes are released inside a vehicle under high-temperatures (associated with a car standing in a summer sun), since the interior materials of the car and adhesives used for them also include an adhesive and a binder containing aldehydes. The Japan Automobile Manufacturers Association, Inc. announced officially that Volatile Organic Compound (VOC) including the aldehyde should be reduced in new cars to be on the market on/after April 2007. The requirements for the VOC on an automobile are much stricter than that of above-mentioned Building Code. Although research and study to meet the requirements have been diligently made, interior materials capable of effectively capturing and decomposing both formaldehyde and acetaldehyde have not been developed to date.

Patent references 1-4 below are related to an interior material and the like capable of adsorbing formaldehyde.
Patent reference 1: JP 2005-28797A
Patent reference 2: JP 62-1501A
Patent reference 3: JP 2000-356022A
Patent reference 4: JP 2005-111701A JP2005-28797A discloses a method for manufacturing a wood fiber board by a wet process comprising steps of: press-drying a wet mat to form a wood fiber board, then immediately applying paraffin wax emulsion containing a formaldehyde absorbing agent to the surface of the wood fiber board, and letting the paraffin wax emulsion be crystallized by the retained heat of the wood fiber board to fix the formaldehyde adsorbing agent to the wood fiber along with the wax applied layer.

JP 62-1501A discloses a method for providing a fiber board formed by hot-pressing a fiber mat with a formaldehyde capturing function in addition to moisture adjustment by spraying or applying a water solution containing an aldehyde capturing agent onto one or both sides of the fiber board.

JP 2000-356022A discloses a method for providing a base material with a formaldehyde capturing function by applying a paint containing adsorbent capable of chemically adsorbing a formaldehyde to a surface of the base material containing a formaldehyde adsorbent.

JP 2005-111701A discloses a method for providing a board with a formaldehyde capturing function by applying a water solution containing an adsorbent capable of chemically adsorbing a formaldehyde to a rear side of insulation board using roll coating.

Technologies disclosed in the above four references make it possible to obtain an interior material and the like capable of capturing a formaldehyde and decomposing it. However they do not make it possible to obtain an interior material capable of capturing an acetaldehyde and decomposing it to meet the requirement set out in the automobile standards. Reasons why these technologies do not aim to capture and decompose an acetaldehyde are, first, no regulation value of acetaldehyde is clearly defined in the Building Code, second, the reactivity of formaldehyde is higher than that of acetaldehyde, and further the boiling point of formaldehyde is −19° C. while boiling point of acetaldehyde is 21° C., consequently, volatilization of formaldehyde is much more than that of acetaldehyde at the same temperature, and an amino group which normal capturing agents include can react with formaldehyde much more than with acetaldehyde at the same temperature. The present inventors have found that in order to completely solve the problems of "Sick House" and "Sick Car", however, not only should formaldehyde be captured and decomposed, but also acetaldehyde has to effectively be captured and decomposed.

SUMMARY OF THE INVENTION

An object of the present invention is to provide a fiber board capable of effectively capturing and decomposing both formaldehyde and acetaldehyde.

To accomplish the above object, the inventive board capable of capturing and decomposing aldehyde comprises a fiber board comprising at least 30 wt % of a plant fiber based on the weight of the fiber board, and an aldehyde capturing agent comprising carbodihydrazide, wherein the aldehyde capturing agent is impregnated and solidified inside one side of the fiber board or inside both sides of the fiber board.

The plant fiber includes fiber from a variety of plant sources such as wood fiber, hemp, kenaf and the like. When a fiber board comprises the plant fiber of greater than 30 wt % (based on the weight of the fiber board), the fiber board becomes slightly acidic of pH 4-6. The capability of the carbodihydrazide for capturing and decomposing aldehyde (or deodorizing effect), particularly the capability of capturing and decomposing both formaldehyde and acetaldehyde can be increased by impregnating a carbodihydrazide as a component of the aldehyde capturing agent, into the slightly acidic fiber board. Also, the capability of the aldehyde capturing agent for capturing and decomposing aldehyde can be further increased when a combination of carbodihydrazide and organic acid dihydrazide compound such as dihydrazide adipate or dihydrazide succinate are used together, or when a combination of carbodihydrazide is used with a guanidine salt.

In the fiber board with mild acidity of pH 4-6, a carbonyl group on the carbodihydrazide is activated thereby making the amino group more nucleophilic. Therefore carbodihydrazide reacts easily with aldehyde. Since it has two amino groups, carbodihydrazide reacts easily with not only formaldehyde, but also immediately with acetaldehyde to decompose them, and as such, the formaldehyde and acetaldehyde are effectively captured. The amino group of a conventional aldehyde capturing agent has a higher probability of reacting with formaldehyde than acetaldehyde at the same temperature. Because of the mild reactivity and volatility of acetaldehyde, the conventional aldehyde capturing agent's reaction with acetaldehyde tends to be slower compared with formaldehyde. Hence, a majority of amino groups of the conventional aldehyde capturing agents are consumed in the reaction with formaldehyde, which leads to a poor reaction with acetaldehyde, i.e., acetaldehyde would not be sufficiently captured and decomposed.

A carbodihydrazide as a component of the aldehyde capturing agent is used in the form of aqueous solution. As used herein, the term "aldehyde" includes both formaldehyde and acetaldehyde. A carbodihydrazide is a compound having a chemical formula represented as $NH_2NH-CO-NHNH_2$, which has an amino group ($-NH_2$) at both ends. The reaction between carbodihydrazide and formaldehyde is represented in chemical reaction formula 1 below. The reaction between carbodihydrazide and acetaldehyde is represented in chemical reaction formula 2 below.

~NHNH$_2$(end amino group)+HCHO(formaldehyde) → -NHN=CH$_2$+H$_2$O   [Chemical Reaction Formula 1]

~NHNH$_2$(end amino group)+CH$_3$CHO(acetaldehyde) → ~NHN=CHCH$_3$+H$_2$O   [Chemical Reaction Formula 2]

As shown in the above formulas, carbodihydrazide will react without having a methylol intermediate in the process. However, normal amide type compounds complete the reaction via formation of methylol as shown in formulas 3 and 4 below.

~NH$_2$(amino group)+HCHO(formaldehyde)→~NHCH$_2$OH(methylol compound)   (Step 1)

2~NHCH$_2$OH~→~NHCH$_2$OCH$_2$NH~(methylene ether compound)+H$_2$O   (Step 2)

~NHCH$_2$OH+H$_2$N~→~NHCH$_2$NH~(methylene linkage compound)+H$_2$O   (Step 3) [Chemical Reaction Formula 3]

~NH$_2$(amino group)+CH$_3$CHO(acetaldehyde)→~N=CH—CH$_3$+H$_2$O   [Chemical Reaction Formula 4]

The fiber board comprises a plant fiber in an amount of 30 wt % or more based on the weight of the fiber board and the surface is formed rough so that the fiber board has a porous surface, which increases absorption performance with the aldehyde by capillary action and further can expedite impregnation of the solution containing the aldehyde capturing agent into the fiber board.

The above-mentioned aldehyde capturing agent can be impregnated and set inside a single side of the fiber board or both sides by infiltrating from one side or both sides. The inventors have found that each of the fiber boards with aldehyde capturing agent on a single side and on both sides is excellent in capturing and decomposing aldehyde. In terms of manufacturing costs, however, fiber boards with an aldehyde capturing agent on a single side is better and for higher performance of capturing and decomposing aldehyde, fiber boards with aldehyde capturing agent on both sides is better.

The fiber board of the present invention can effectively capture and decompose not only formaldehyde but acetaldehyde. Therefore when the fiber board is used as an interior material for a house and car, the problems of Sick House and Sick Car can effectively be reduced or even obviated. The fiber board of the present invention has an aldehyde capturing agent in the form of a solidified three-dimensional layer made by impregnating the fiber board with the aldehyde capturing agent through a porous surface of the fiber board up to some depth under the surface. This fiber board can hold an aldehyde capturing agent more securely compared to a fiber board with only a layer of aldehyde capturing agent on the surface, and provides better action in the decomposition of aldehyde.

Another embodiment of the fiber board capable of capturing and decomposing aldehyde of the present invention is characterized in that the fiber board is a wood fiber board comprising at least 90 wt % of wood fiber based on the weight of the fiber board.

A wood fiber board comprising at least 90 wt % wood fiber of the present invention are normal hard fiber boards such as a hard board (HB) and an insulation board, and preferably do not include plywood or MDF (medium-density fiber board) which contain appreciable quantities of adhesive containing aldehyde. Carbodihydrazide is effective in capturing the level of aldehyde included in normal wood materials and is also effective with respect to hard boards and insulation boards, since hard boards contain only minute amounts of adhesive and an insulation board uses a starch-containing adhesive having a small amount of aldehyde. On the contrary, a plywood or a MDF releases a large amount of aldehyde at one time, which makes it difficult for the carbodihydrazide, even if adequately impregnated and solidified, to capture the aldehyde so as to meet the low concentration required by regulation.

Another embodiment of the fiber board capable of capturing and decomposing aldehyde of the present invention is characterized in that the fiber board is made of a mixture material comprising a resin fiber and a plant fiber, wherein at least 30 wt % of the fiber board is the resin fiber.

In the board comprising the mixture material, the resin fiber comprises a thermoplastic resin which usually does not contain aldehyde, including polypropylene, polylactic acid, polybutylene succinate, polyethylene, and polyethylene terephthalate, and the plant fiber is made from wood material, hemp and/or the like. An example of a commercial product of such a board is a "Wood Plastic Sheet" (WPS)™ (manufactured by NICHIHA Corporation). The board can further contain a kenaf and/or cotton. Table I below shows the formaldehyde content of various board materials, i.e., hard board, insulation board, WPS™, plywood and MDF, which were measured by AHMT method (4-amino-3-hydrazino-5-mercapto-1,2,4,-triazole method).

TABLE 1

| Board material | Formaldehyde content (mg/kg) |
| --- | --- |
| Hard board | 16 |
| Insulation board | 21 |
| WPS | 10 |
| Plywood | 160 |
| MDF | 450 |

It is possible to widely adjust the rigidity and/or strength of a fiber board while keeping mild acidity of the fiber board as described above by manufacturing the fiber board using a mixture material of a fiber material made of aldehyde-free resin and an appropriate plant fiber.

Further, another embodiment of the present invention is a method wherein a solution comprising the aldehyde capturing agent, a solvent and optionally a surfactant is impregnated and solidified inside the fiber board.

As described above, carbodihydrazide is impregnated inside the fiber board in the form of an aqueous solution. The impregnation of the carbodihydrazide can be accelerated by adding surfactant to the aqueous solution. As for the surfactant, it is preferable to use any one of an anionic surfactant, a nonionic surfactant and a cationic surfactant.

As for the anionic surfactant, there are for example, at least one of higher alcohol sulfate (sodium salt or amine salt), alkyl allyl sulfonate (sodium salt or amine salt), alkyl naphthalene sulfonate (sodium salt or amine salt), alkyl naphthalene sulfonate condensate, alkyl phosphate, dialkyl sulfosuccinate, rosin soap, and fatty acid salt (sodium salt or amine salt). As for the nonionic surfactant, there are for example, at least one of polyoxyethylene alkyl ether, polyoxyethylene alkylphenyl ether, polyoxyethylene alkyl ester, polyoxyethylene alkyl amine, polyoxyethylene alkylolamine, polyoxyethylene alkyl amide, sorbitan alkyl ester, and polyoxyethylene sorbitan alkyl ester. As for the cationic surfactant, there are for example, at least one of octadecylamine acetate, imidazoline derivative acetate, polyalkylene polyamine derivative or salt thereof, octadecyl trimethylammonium chloride, trimethylaminoethyl alkylamide halogenide, alkyl pyridinium sulphate, alkyl trimethylammonium halogenide. A nonionic surfactant is particularly preferred because it is highly compatible with a wood fiber board.

As for the aldehyde capturing agent, an aqueous solution of 5-30 wt % of the aldehyde capturing agent based on the weight of the aqueous solution is normally used. As for the solvent, however, water-soluble organic solvent such as methanol, ethanol, isopropanol or acetone can be used together with water or in lieu of water.

As described above, a fiber board for capturing aldehyde of the present invention, which comprises an impregnated and solidified aldehyde capturing agent containing carbodihydrazide inside one surface or both surfaces of the fiber board having mild acidity, i.e., pH 4-6, can capture and decompose effectively both formaldehyde and acetaldehyde.

DESCRIPTION OF THE PREFERRED EMBODIMENT

Figure 1:
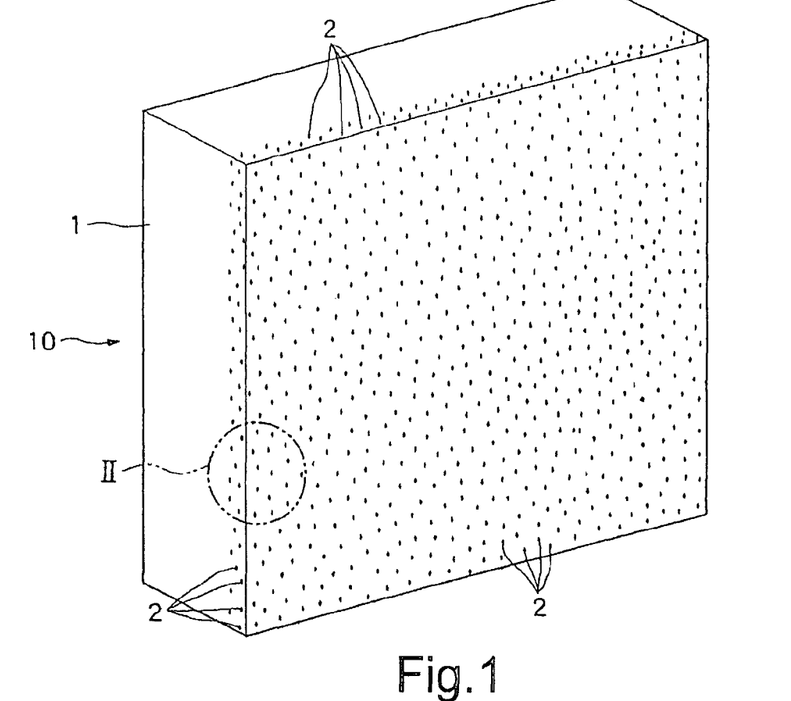
FIG. 1 is a perspective view showing one embodiment of a fiber board of the present invention.
Figure 2:
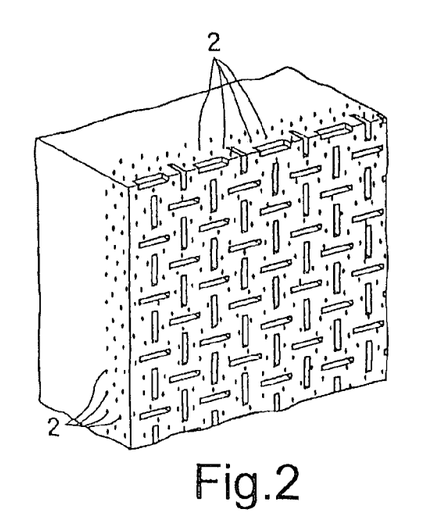
FIG. 2 is an enlarged sectional view of portion II of FIG. 1
Figure 3:
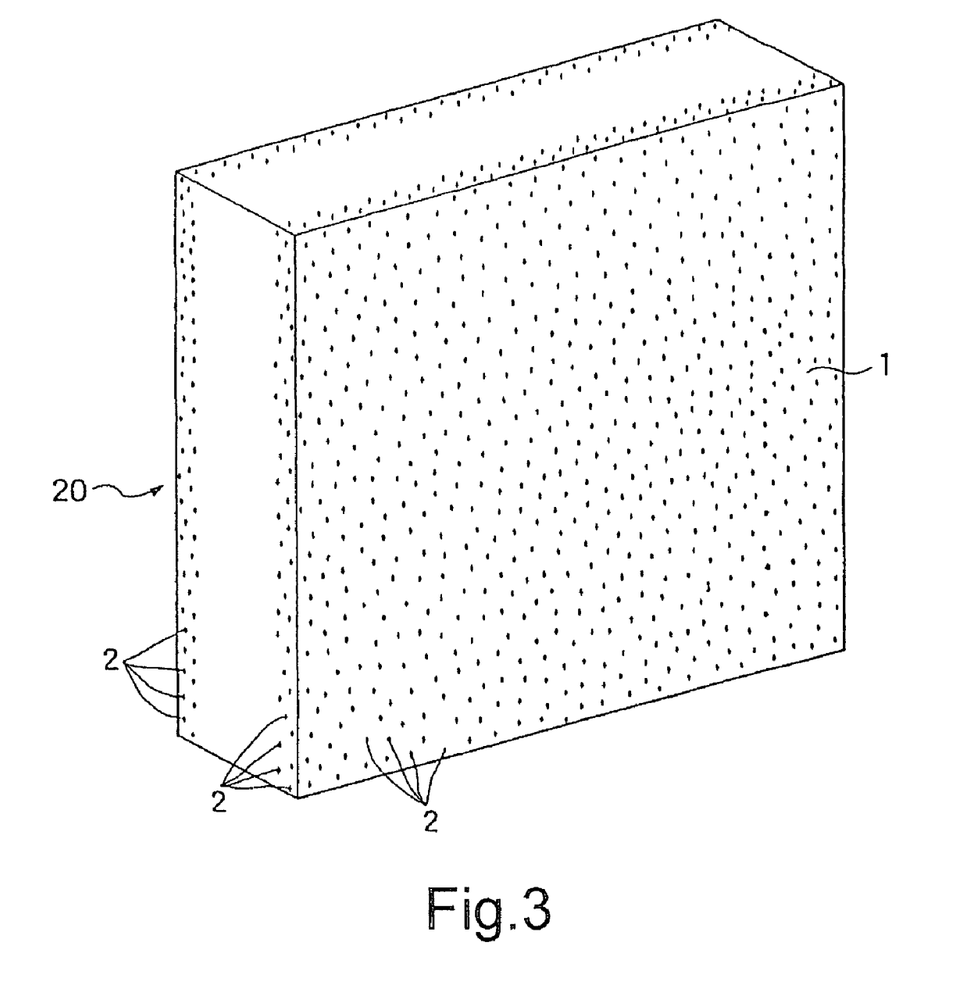
FIG. 3 is a perspective view showing another embodiment of a fiber board of the present invention.

An embodiment of the fiber board capable of capturing and decomposing aldehyde of the present invention is set forth in the following description with reference to the appended figures. FIG. 1 is a perspective view showing one embodiment of a flat fiber board of the present invention. FIG. 2 is an enlarged sectional view of portion II of FIG. 1. FIG. 3 is a perspective view showing another embodiment of a flat fiber board of the present invention. The fiber board of the present invention can be formed into any shape so as to be fit for its purpose and use as, for example, an interior material for an automobile.

Embodiment 1

FIG. 1 shows a plate-like fiber board 10 made of a wood fiber board 1 containing impregnated and solidified carbodihydrazide 2 inside the one surface of the wood fiber board and FIG. 3 shows a plate-like fiber board 20 made of a wood fiber board 1 containing impregnated and solidified carbodihydrazide 2 inside both surfaces of the wood fiber board 1. As shown in FIG. 2 (which is an enlarged sectional view of FIG. 1), a rear surface (a surface facing the wire-mesh at the wet mat forming process to be described below) of the wood fiber board 1 is formed to be porous so that the aqueous solution of carbodihydrazide can easily impregnate inside. The manufacturing process of the fiber board 10 and fiber board 20 is described below.

Slurry Preparation

As a pulp to be used, any of the following pulps can be used, i.e., a mechanical pulp obtained by pulpifying wood chips through a mechanical treatment, a chemical pulp obtained through chemical treatment and a semi-ground pulp obtained through a combination of mechanical treatment and chemical treatment. Normally, the pulp is dispersed into water to form a slurry in a concentration of about 3 wt %. Also normally, a binder of a thermosetting resin such as phenol resin, melamine resin, urea resin and the like is added to the slurry to account for about 0.5-1.5 wt % and a water repellent agent such as paraffin wax, silicon compound (such as silicone), zirconium compound and the like is added to the slurry to account for about 0.5-1.5 wt %. Further an antiseptic agent, antiaging agent and the like may be added on an as-needed basis to prepare the slurry.

Wet Mat Forming

The slurry is diluted up to about 1-1.5 wt % as pulp concentration. The wet mat is formed using publicly known methods such as a cylinder mold method, Fourdrinier wire method or Chapman Process. Generally, the slurry is cast onto the wire mesh and dehydrated by vacuum suction from the rear side of the wire mesh to form a wet mat. A longitudinal direction of the pulp in the mat is oriented in the horizontal direction on the front side of the mat and in the vertical direction on the rear side (facing the wire mesh) of the mat because of the vacuum suction. The density of pulp is relatively high in the front surface side and relatively low in the rear surface side. The rear surface forms as a rough surface because of printing of the wire mesh pattern thereon. When needed, the wet mat can be dehydrated further by cold press up to about 30-40% of dryness.

Hot Press

The mat described above is then hot-pressed. In the hot-pressing process, the temperature is normally 180-220° C., and the pressing is made through three stages, i.e., first stage of 40 Kg/cm$^2$ for 50-60 seconds, second stage of 8-10 Kg/cm$^2$ for 60-90 seconds, and third stage of 20-25 Kg/cm$^2$ for 60-90 seconds. The second stage of this three stage pressing is a degasification process where steam contained in the wet mat can be easily released to prevent the wet mat from a blowout. The hot press has an upper mold and a lower mold. Water is squeezed out from the wet mat by placing a wire mesh or perforated plate on the lower mold. As described above, a longitudinal direction of the pulp in the rear side of the mat is oriented in the vertical direction and the density of the pulp is relatively low on the rear side of the mat, which helps guide the water as it is squeezed out of the wet mat.

The wet mat contains a slight amount of thermosetting resin binder having formaldehyde. However, the formaldehyde in the resin is liberated by hot pressing and is mostly volatilized.

The press molded wood fiber board is turned over to make the rear side face upward and an aldehyde capturing agent solution is sprayed onto the rear surface of the wood fiber board from above while the wood fiber board is kept hot. Spraying from above provides a much better percentage of the aldehyde capturing agent than that of spraying from below, that is, almost all the sprayed aldehyde capturing agent can be landed on the fiber board. This makes it possible for the facilities to be kept clean and no recovery system for the aldehyde capturing agent is required.

Aldehyde Capturing Agent

A carbodihydrazide is used as an aldehyde capturing agent for capturing aldehyde including formaldehyde and acetaldehyde. If a solution comprising 20 wt % or more of carbodihydrazide is sprayed onto the wood fiber board, the board surface whitens and the adhesion performance with other base materials to be combined may become worse. Also, the stability during the cold season, particularly, the precipitation of crystals could be a problem. Therefore, the content of carbodihydrazide is preferably less than 20 weight % and a sufficient aldehyde capturing performance can be shown even when the content is 15 wt % or less based on the weight of the solution.

A capturing agent (sometimes referred to herein as a deodorizing agent) including only a carbodihydrazide as a capturing component can show sufficient capturing performance (sometimes referred to herein as deodorizing performance) toward both formaldehyde and acetaldehyde. When organic acid dihydrazide is further added, the capturing performance can be increased. The organic acid dihydrazide includes at least one of dihydrazide adipate, dihydrazide succinate, dihydrazide sebacate, dihydrazide isophthalate, dihydrazide oxalate, dihydrazide malonate, dihydrazide maleate, dihydrazide fumarate and dihydrazide malate.

Among those organic acid dihydrazides, both dihydrazide adipate and dihydrazide succinate have good solubility with water. In the case of singularly using dihydrazide adipate as a component of the deodorizing agent, it is found by HPLC analysis using DNPH method that the odor of formaldehyde is eliminated excellently but the odor of acetaldehyde is not eliminated at all, and that acetaldehyde tends to be released more. However, when carbodihydrazide and dihydrazide adipate are used in combination, deodorizing effect on both formaldehyde and acetaldehyde can be improved. In combination, if a content of dihydrazide adipate is 10 wt % or more, release of acetaldehyde may be increased depending on the base material used. Therefore, the content of dihydrazide adipate is preferably less than 10 wt % based on the weight of the solution.

In the case of using only a dihydrazide succinate as a component of the deodorizing agent, it is found by HPLC analysis using the DNPH method that the odor of acetaldehyde is eliminated excellently but an odor of formaldehyde is not eliminated at all, and that formaldehyde tends to be released more. However, when carbodihydrazide and dihydrazide succinate are used in combination, the deodorizing effect on both formaldehyde and acetaldehyde can be improved. In the combination use, if a content of dihydrazide succinate is 10 wt % or more, the release of acetaldehyde may be increased depending on the base material used. Therefore, the content of dihydrazide succinate is preferably less than 10 wt % based on the weight of the solution.

The organic acid dihydrazides other than dihydrazide adipate and dihydrazide succinate have low water solubility and are poor in performance of deodorizing acetaldehyde.

In view of above, it is concluded that organic acid dihydrazide to be used in combination with carbodihydrazide is preferably dihydrazide adipate or dihydrazide succinate, and the content thereof is preferably less than 10 wt % based on the weight of the solution.

Further a guanidine salt can be added to carbodihydrazide and/or organic acid dihydrazide to form the capturing agent (deodorizing agent). The guanidine includes at least one of guanidine hydrochloride, aminoguanidine hydrochloride, aminoguanidine bicarbonate, guanidine sulfamate, guanidine carbonate, guanidine phosphate, and guanidine nitrate.

In the case of using only a guanidine sulfamate, the deodorizing effect on formaldehyde and acetaldehyde is weak. However, when guanidine sulfamate is used together with carbodihydrazide and dihydrazide adipate or dihydrazide succinate, the deodorizing effect on both formaldehyde and acetaldehyde can be greatly improved. When a content of guanidine sulfamate becomes 10 wt % or more, a base material may become sticky. Therefore the content is preferably less than 10 wt % based on the weight of the solution.

In the case of the combined use of a guanidine salt other than guanidine sulfamate, the deodorizing effect with formaldehyde and acetaldehyde may be extremely lowered, and a base material may change in surface color or become sticky. It is preferable to use a guanidine sulfamate in terms of deodorizing performance with aldehyde, particularly with acetaldehyde.

Solvent

Normally the above-mentioned formaldehyde capturing agent is used in the form of an aqueous solution of 5-30 wt %. As for the solvent, however, water-soluble organic solvent such as at least one of methanol, ethanol, isopropanol and acetone can be used together with water or in lieu of water.

Surfactant

Further, anionic surfactant, nonionic surfactant or cationic surfactant may be added to the aldehyde capturing solution as a penetrating agent. As for anionic surfactant, there are, for example, at least one of higher alcohol sulfate (sodium salt or amine salt), alkyl allyl sulfonate (sodium salt or amine salt), alkyl naphthalene sulfonate (sodium salt or amine salt), alkyl naphthalene sulfonate condensate, alkyl phosphate, dialkyl sulfosuccinate, rosin soap, and fatty acid salt (sodium salt or amine salt). As for nonionic surfactant, there are, for example, at least one of polyoxyethylene alkyl ether, polyoxyethylene alkylphenyl ether, polyoxyethylene alkyl ester, polyoxyethylene alkyl amine, polyoxyethylene alkylolamine, polyoxyethylene alkyl amide, sorbitan alkyl ester, and polyoxyethylene sorbitan alkyl ester. As for cationic surfactant includes, there are, for example, at least one of octadecylamine acetate, imidazoline derivative acetate, polyalkylene polyamine derivative or salt thereof, octadecyl trimethylammonium chloride, trimethylaminoethyl alkylamide halogenide, alkyl pyridinium sulphate, alkyl trimethylammonium halogenide.

Spray Coating of Aldehyde Capturing Agent Solution

A aldehyde capturing agent is sprayed onto a rear surface of the flat wood fiber board while the wood fiber board is hot. The temperature is 80-180° C., preferably 100-160° C. An amount of spray coating is about 1.5-3.0 g/m$^2$ in terms of solid content.

When the spray coating is carried out, a mist of the aldehyde capturing solution is applied to the rear surface of the wood fiber board. As mentioned above, the rear surface is formed rough because of printing of the wire mesh pattern thereon and also a longitudinal direction of the pulp is oriented in the vertical direction on the rear surface region and the density of pulp is relatively low in the rear surface side, which allows the solution to effectively penetrate inside the wood fiber board at the rear surface region. As the solution is applied to the rear surface in the form of a mist, the solvent of the solution is rapidly evaporated and a vapor pressure of the evaporated solvent pushes the aldehyde capturing solution further inside the wood fiber board. Meanwhile the solvent is rapidly evaporated, which prevents the solution from penetrating deep inside. As a result, distortion of the wood fiber boards by the impregnated solvent can be avoided. Thus, the aldehyde capturing agent is impregnated inside the board to some extent and is solidified there. Therefore, the concentration of the aldehyde capturing agent in the vicinity of rear surface is kept high. After spray coating is made, the wood fiber board is cooled down to, for example room temperature.

Moisture Adjustment

After the wood fiber board is cooled down, the water content of the wood fiber board is adjusted by water spraying (moisture adjustment). At this point, essentially none of the aldehyde capturing agent will elute into the water since the agent is solidified and fixed at some depth inside the board. If desired, an aldehyde capturing agent solution is applied onto the front surface of the wood board at the same time as the moisture adjustment is made. As for the coating method, spray coating is normally used and, for example, roll coating, knife coating or curtain coating can also be used. After the moisture adjustment process, the wood fiber board is conditioned for a few days, then cut off to a predetermined size. The aldehyde capturing agent solution may be applied after moisture adjustment and conditioning if the board is exposed to some adequate drying process.

Example 1

Using Hard Type Wood Fiber Board

A slurry is prepared by dispersing mechanical pulp (average length 1 cm) of 100 parts by weight, phenol resin of 1 part by weight and paraffin wax of 1 part by weight in water so that the slurry has a pulp concentration of 3 wt %. The slurry was diluted to a pulp concentration of 1.2 wt % and then the slurry was cast onto the wire mesh and dehydrated by vacuum suction from the rear side of the wire mesh to form a wet mat. The wet mat was adjusted by cold press so as to have 35% dryness and then was subjected to hot press of which temperature was 200° C., three stage hot press condition was 40 Kg/cm$^2$ for 50 seconds, 9 Kg/cm$^2$ for 70 seconds and 23 Kg/cm$^2$ for 80 seconds. The percent dryness is defined as a formula below.

(Percent dryness)=(weight of dried wet mat/weight of wet mat before dried)×100(%)     [Formula]

The fiber board after hot press processing was placed rear surface up and an organic amide-base aldehyde capturing agent solution (FAC-2™ containing a carbodihydrazide of 12.5 wt % manufactured by Miki Riken Kogyo Kabushiki Kaisha) was sprayed onto the rear surface without diluting so as to form 3 g/m$^2$ in terms of solid content. When the spray was carried out, the temperature of the fiber board was 130° C. After spraying, the fiber board was cooled and water is sprayed on the rear surface to adjust the water content, then the capturing agent solution (concentration: 12.5 wt %) is sprayed onto a front surface of the fiber board without diluting so as to form 3 g/m$^2$ in terms of solid content and afterward the board was conditioned for 12 days.

Example 2

Of Fiber Board Using Wood Plastic Sheet

The fiber board of the present invention can also be manufactured by manufacturing a board material comprising a mixture material made of a resin fiber and a plant fiber and then impregnating the above-mentioned carbodihydrazide inside the board where it is solidified in one side or both sides thereof as in FIG. 1 and FIG. 2.

Wood plastic sheet (manufactured by NICHIHA Corporation) is prepared comprising a wood fiber (water content: 30 wt % or less) of 37 parts by weight, a hemp fiber of 10 parts by weight, a polypropylene fiber (melting point 170° C.) of 50 parts by weight, a core-in-sheath polypropylene fiber (polypropylene fiber of which periphery is coated with polyethylene of which melting point is 110° C.) of 3 parts by weight.

The wood plastic sheet was prepared as follows. First, the above-mentioned materials were mixed homogeneously using a blender to obtain a fleece (homogeneously mixed). Then the fleece is run through a hot air oven heated at 130° C. so that the polyethylene resin constituting periphery of core-in-sheath polypropylene fiber is melted to bind fibers inside the fleece and retain the shape. The shape-retained material becomes firmer after passing through a thickness regulating roll. Instead of using an oven, a needle punch method can be applied to physically bind the fibers. When the needle punch method is used, a core-in-sheath polypropylene fiber is not needed. By the process above, a bulky mat type molding material with bulk density 0.1 g/cm$^3$, weight per unit area 2.0 kg/m$^3$ and thickness 20 mm was obtained. This molding material was subjected to hot compression for 30 seconds using a hot plate of 220-230° C. under pressure of 490,000 Pa (=5 kg/cm$^2$). A glass fiber woven cloth with fluorocarbon resin coating was used as a sheet belt. Thus, a thermoplastic material of which temperature is 200-210° C. and thickness is 2.5-3.0 mm was obtained. This thermoplastic material was subjected to cold compression for 20 seconds using a mold of 50° C. or less under pressure of 980,000 Pa (=10 kg/cm$^2$) to form an intended wood plastic sheet. Then the capturing agent used in Example 1 is applied to both surfaces of the wood plastic sheet by spraying a predetermined amount and the wood plastic sheet was conditioned for a predetermined time period.

Test and the Result of Vaporizing Amount of Aldehyde

Samples for the test are prepared as follows. As a fiber board, a plurality of sample fiber boards which are the same as the fiber board made in the Example 1 using hard type wood fiber board are prepared. The thickness of each sample fiber board is 2.5 mm and the size is 80 cm$^2$. Each sample is different from each other in composition of capturing agent to be impregnated and solidified, in which side of the board the agent is applied (only rear side, only front side or both side), and in the applied amount. Each sample fiber board is put in the 10 L Tedlar® bag containing 4 L of pure nitrogen gas and heated at 65° C. for 2 hours. Then all 4 L is collected by DNPH cartridge and the amount of vaporized aldehyde is measured by high-performance liquid chromatography (HPLC) and the evaluation was made. A capturing agent FC-478T™ (manufactured by Miki Riken Kogyo Kabushiki Kaisha) is an organic amide-based aldehyde capturing agent with single amino group at an end and without a carbonyl group. As for vaporizing amount of formaldehyde, an acceptable limit is defined as 0.3 µg/sample fiber board. As for acetaldehyde, an acceptable limit is defined as 0.4 µg/sample fiber board. Results shown in Tables 2 and 3 below are represented as normalized data based on the acceptable limit, i.e., relative value when each of the acceptable limits 0.3 µg and 0.4 µg is assumed as value one (1). Symbol "O" means "acceptable" and symbol "X" means "not acceptable.

TABLE 2

Result with respect to formaldehyde

| Base material | Capturing agent | Application amount (solid content: g/m²) Front side | Application amount (solid content: g/m²) Rear side | Vaporized amount of formaldehyde | Evaluation |
|---|---|---|---|---|---|
| HB | control (no agent) | 0 | 0 | 12.0 | X |
| HB | FC-478T | 3 | 3 | 1.2 | X |
| HB | FC-478T | 6 | 6 | 0.6 | ○ |
| HB | FC-478T | 9 | 9 | 0.6 | ○ |
| HB | FAC-2 | 3 | 3 | Less than 0.3 | ○ |
| HB | FAC-2 | 6 | 6 | Less than 0.3 | ○ |
| plywood | FAC-2 | 3 | 3 | 2.0 | X |
| plywood | FAC-2 | 6 | 6 | 0.8 | ○ |
| MDF | FAC-2 | 3 | 3 | 2.2 | X |
| MDF | FAC-2 | 6 | 6 | 1.2 | X |
| HB* | FAC-2 | 0 | 6 | Less than 0.3 | ○ |
| HB* | FAC-2 | 6 | 0 | Less than 0.3 | ○ |

*non-application side is sealed for the measurement

TABLE 3

Result with respect to acetaldehyde

| Base material | Capturing agent | Application amount (solid content: g/m²) Rear side | Application amount (solid content: g/m²) Front side | Vaporized amount of acetaldehyde | Evaluation |
|---|---|---|---|---|---|
| HB | control (no agent) | 0 | 0 | 11.0 | X |
| HB | FC-478T | 3 | 3 | 7.5 | X |
| HB | FC-478T | 6 | 6 | 5.0 | X |
| HB | FC-478T | 9 | 9 | 5.5 | X |
| HB | FAC-2 | 3 | 3 | 0.3 | ○ |
| HB | FAC-2 | 6 | 6 | Less than 0.3 | ○ |
| plywood | FAC-2 | 3 | 3 | 3.2 | X |
| plywood | FAC-2 | 6 | 6 | 1.5 | X |
| MDF | FAC-2 | 3 | 3 | 2.6 | X |
| MDF | FAC-2 | 6 | 6 | 1.6 | X |
| HB* | FAC-2 | 0 | 6 | 0.3 | ○ |
| HB* | FAC-2 | 6 | 0 | 0.3 | ○ |

*non-application side is sealed for the measurement

It is concluded from the results of Tables 2 and 3 that when both a hard board is used as a base material and a FAC-2 is used as a capturing agent, a vaporized amount of both formaldehyde and acetaldehyde becomes acceptable no matter whether the capturing agent is applied onto one side or both sides.

In the case of using a wood plastic sheet as base material, the test was made in the same manner as above and the results are shown in Tables 4 and 5. Symbol "O" means "acceptable" and symbol "X" means "not acceptable.

TABLE 4

Result with respect to formaldehyde

| Capturing agent | Application amount (solid content: g/m²) Front side | Application amount (solid content: g/m²) Rear side | Vaporized amount of formaldehyde | Evaluation |
|---|---|---|---|---|
| control (no agent) | 0 | 0 | 9.7 | X |
| FC-478T | 3 | 3 | 1.4 | X |
| FC-478T | 6 | 6 | 0.6 | ○ |
| FC-478T | 9 | 9 | 0.5 | ○ |
| FAC-2 | 3 | 3 | Less than 0.3 | ○ |
| FAC-2 | 6 | 6 | Less than 0.3 | ○ |
| FAC-2* | 0 | 6 | Less than 0.3 | ○ |

*non-application side is sealed for the measurement

TABLE 5

Result with respect to acetaldehyde

| Capturing agent | Application amount (solid content: g/m²) Front side | Application amount (solid content: g/m²) Rear side | Vaporized amount of acetaldehyde | Evaluation |
|---|---|---|---|---|
| control (no agent) | 0 | 0 | 3.8 | X |
| FC-478T | 3 | 3 | 1.6 | X |
| FC-478T | 6 | 6 | 1.3 | X |
| FC-478T | 9 | 9 | 1.1 | X |
| FAC-2 | 3 | 3 | 0.7 | ○ |
| FAC-2 | 6 | 6 | Less than 0.3 | ○ |
| FAC-2* | 0 | 6 | Less than 0.3 | ○ |

*non-application side is sealed for the measurement

It is concluded from the results of Tables 4 and 5 that when FAC-2 is used as a capturing agent, a vaporized amount of both formaldehyde and acetaldehyde becomes acceptable no matter whether the capturing agent is applied onto one side or both sides.

As a result of above experiments, it is found that when an organic amide-based aldehyde capturing agent (FAC-2) containing a carbodihydrazide is used as a capturing agent, a vaporized amount of both formaldehyde and acetaldehyde becomes acceptable in both cases of using a hard board and a wood plastic sheet as base material.

In the case of using a combination of carbodihydrazide and other additives as a capturing agent, the test was made in the same manner as above and the results are shown in Table 6. Symbol "O" means "acceptable" and symbol "X" means "not acceptable.

TABLE 6

| Symbol | Content (wt %) carbo-dihydrazide | Content (wt %) dihydrazide adipate | Content (wt %) dihydrazide succinate | Content (wt %) guanidine sulfamate | Vaporized amount(*) form-aldehyde | Vaporized amount(*) acet-aldehyde | Evaluation | Change in surface color | Stickiness of base material |
|---|---|---|---|---|---|---|---|---|---|
| A | 20 | 0 | 0 | 0 | 0.5 | 0.7 | ○ | ○ | ○ |
| B | 15 | 5 | 0 | 0 | 0.1 | 0.4 | ○ | ○ | ○ |
| C | 15 | 0 | 5 | 0 | 0.2 | 0.4 | ○ | ○ | ○ |

TABLE 6-continued

| Symbol | Content (wt %) | | | | Vaporized amount(*) | | Evaluation | Change in surface color | Stickiness of base material |
|---|---|---|---|---|---|---|---|---|---|
| | carbodihydrazide | dihydrazide adipate | dihydrazide succinate | guanidine sulfamate | formaldehyde | acetaldehyde | | | |
| D | 10 | 2.5 | 0 | 0 | 0.1 | 0.3 | ○ | ○ | ○ |
| E | 0 | 10 | 0 | 0 | 0.3 | 7.5 | X | ○ | ○ |
| F | 0 | 0 | 20 | 0 | 13.0 | 0.6 | X | X | ○ |
| G | 10 | 0 | 0 | 10 | 0.2 | 0.4 | ○ | ○ | X |
| H | 5 | 5 | 0 | 5 | 0.1 | 0.2 | ○ | ○ | ○ |
| I | 0 | 0 | 0 | 20 | 2.3 | 3.6 | X | ○ | X |
| J | 0 | 10 | 0 | 10 | 0.3 | 2.6 | X | ○ | X |
|   | 0 | 0 | 0 | 0 | 10.6 | 7.2 | X | ○ | ○ |

In Table 6, a capturing agent (symbol A) consisting of carbodihydrazide shows a good capturing performance. In addition, Table 6 also indicates that other capturing agent such as a combination of carbodihydrazide and dihydrazide adipate (symbols B and D), a combination of carbodihydrazide and dihydrazide succinate (symbol C), or a combination of carbodihydrazide and guanidine sulfamate (symbol G) has a better capturing performance. Further it is found that a capturing agent (symbol H) containing carbodihydrazide, dihydrazide adipate and guanidine sulfamate shows the best capturing performance. Capturing agents (symbols A, B, C, D and H) also show good results about a change in surface color and a stickyness of base material, i.e., neither color change nor stickyness arises.

Embodiments of the present invention have been set forth in the above description with reference to the appended figures. However, the present invention is not limited to the above-described embodiments, and variations and modifications may be made without departing from the scope of the present invention.

What is claimed is:

1. A board capable of capturing and decomposing formaldehyde and acetaldehyde, wherein the board is a hard board or insulation board comprising:
    wood fiber in an amount of 90 weight % or more of a plant fiber based on the weight of the hard board or insulation board; and
    an aldehyde capturing agent impregnated and solidified inside one side or both sides of the hard board or insulation board in an amount of 3-6 g/m², wherein
    the aldehyde capturing agent comprises carbodihydrazide, dihydrazide adipate and guanidine sulfamate.

2. The board according to claim 1, wherein the plant fiber comprises a wood fiber, a hemp fiber and a kenaf fiber.

3. The board according to claim 1, wherein the aldehyde capturing agent further comprises dihydrazide succinate.

4. The board according to claim 1, wherein the board has a pH of 4-6.

5. The board according to claim 1, wherein the aldehyde capturing agent is impregnated and solidified inside both sides of the hard board or insulation board.

6. A process for preparing the board according to claim 1, said process comprising a step of
    applying a solution comprising the aldehyde capturing agent, a solvent and a surfactant to one side or both sides of the board, and
    solidifying the aldehyde capturing agent, so that the aldehyde capturing agent is impregnated and solidified inside one side or both sides of the board in an amount of 3-6 g/m², wherein
    the aldehyde capturing agent comprises carbodihydrazide, dihydrazide adipate and guanidine sulfamate.

7. The process according to claim 6, wherein the board is heated when the solution is being applied to the board.

8. The board capable of capturing and decomposing formaldehyde and acetaldehyde of claim 1, wherein
    the board has a front surface and a rear surface, the rear surface being porous,
    the aldehyde capturing agent is impregnated and solidified inside the rear surface of the board by a process comprising the steps of:
    spraying a solution comprising the aldehyde capturing agent, a solvent and a surfactant to the rear surface of the board at temperature of 100-160° C., so that the solvent is vaporized and the aldehyde capturing agent is impregnated into and solidified inside the rear surface of the board; and
    drying the board.

9. The board capable of capturing and decomposing formaldehyde and acetaldehyde of claim 1, wherein
    the board has a front surface and a rear surface, the rear surface being porous,
    the aldehyde capturing agent is impregnated and solidified inside the front surface of the board by a process comprising the steps of:
    spraying the solution comprising the aldehyde capturing agent, a solvent and a surfactant to the front surface of the board, so that the solvent is vaporized and the aldehyde capturing agent is impregnated into and solidified inside the front surface of the board; and
    drying the board.

10. The board capable of capturing and decomposing formaldehyde and acetaldehyde of claim 1, wherein
    the board has a front surface and a rear surface, the rear surface being porous,
    the aldehyde capturing agent is impregnated and solidified inside the rear surface of the board by a process comprising the steps of:
    spraying a solution comprising the aldehyde capturing agent, a solvent and a surfactant to the rear surface of the board at temperature of 100-160° C., so that the solvent is vaporized and the aldehyde capturing agent is impregnated into and solidified inside the rear surface of the board; and
    cooling the board to room temperature, and
    the aldehyde capturing agent is impregnated and solidified inside the front surface of the board by the process comprising the steps of:
    spraying a solution comprising the aldehyde capturing agent, a solvent and a surfactant to the front surface of the board, so that the solvent is vaporized and the aldehyde capturing agent is impregnated into and solidified inside the front surface of the board; and drying the board.

11. A board capable of capturing and decomposing formaldehyde and acetaldehyde, wherein the board is a wood plastic sheet (WPS) comprising:

at least 30 weight % of a resin fiber and at least 30 weight % of a plant fiber based on the weight of the WPS, and an aldehyde capturing agent impregnated and solidified inside one side or both sides of the wood plastic sheet in an amount of 3-6 g/m$^2$, wherein the aldehyde capturing agent comprises carbodihydrazide, dihydrazide adipate and guanidine sulfamate.

12. The board according to claim 11, wherein the plant fiber comprises a wood fiber, a hemp fiber and a kenaf fiber.

13. The board according to claim 11, wherein the aldehyde capturing agent further comprises dihydrazide succinate.

14. The board according to claim 11, wherein the resin fiber comprises a thermoplastic resin.

15. The board according to claim 14, wherein the resin fiber is a thermoplastic resin which is at least one selected from the group consisting of polypropylene, polylactic acid, polybutylene succinate, polyethylene, and polyethylene terephthalate.

16. The board according to claim 11, wherein the board has a pH of 4-6.

17. The board according to claim 11, wherein the aldehyde capturing agent is impregnated and solidified inside both sides of the WPS.

18. A process for preparing the board according to claim 11, said process comprising a step of applying a solution comprising the aldehyde capturing agent, a solvent and a surfactant to one side or both sides of the board, and solidifying the aldehyde capturing agent, so that the aldehyde capturing agent is impregnated and solidified inside one side or both sides of the board in an amount of 3-6 g/m$^2$, wherein the aldehyde capturing agent comprises carbodihydrazide, dihydrazide adipate and guanidine sulfamate.

19. The process according to claim 18, wherein the board is heated when the solution is being applied to the board.

* * * * *